US007890115B2

(12) United States Patent
Feng et al.

(10) Patent No.: US 7,890,115 B2
(45) Date of Patent: Feb. 15, 2011

(54) METHOD OF SCHEDULING UPLINK RESOURCES IN CELLULAR COMMUNICATION SYSTEM

(75) Inventors: Minghai Feng, Beijing (CN); Xiaoming She, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 719 days.

(21) Appl. No.: 11/933,952

(22) Filed: Nov. 1, 2007

(65) Prior Publication Data

US 2008/0102822 A1    May 1, 2008

(30) Foreign Application Priority Data

Nov. 1, 2006    (CN) .................. 2006 1 0143251

(51) Int. Cl.
*H04W 72/00* (2009.01)
(52) U.S. Cl. .................. 455/450; 455/1; 455/451; 455/452.1; 455/452.2; 455/453; 370/329; 370/341; 370/431; 370/437
(58) Field of Classification Search .............. 455/1, 455/425, 450, 451, 452.1–452.2, 453, 509; 370/329, 341, 431, 437
See application file for complete search history.

(56) References Cited

U.S. PATENT DOCUMENTS

| | | | |
|---|---|---|---|
| 2007/0270100 A1* | 11/2007 | Agrawal et al. | 455/67.11 |
| 2008/0130593 A1* | 6/2008 | Scheinert et al. | 370/337 |
| 2009/0069023 A1* | 3/2009 | Ahn et al. | 455/450 |

FOREIGN PATENT DOCUMENTS

EP    1653757 A1    5/2006

OTHER PUBLICATIONS

European Search Report for corresponding European Patent Application No. 07021110.7, dated Jun. 1, 2010, 9 pgs.
Feng, Minghai, et al., "Uplink Adaptive Resource Allocation Mitigating Inter-cell Interface Fluctuation for Future Cellular Systems", Proceedings of the 2007 IEEE International Conference on Communications, Jun. 1, 2007, pp. 5519-5524, Glasgow, UK.
Koutsopolous, Iordanis, et al., "Carrier assignment algorithms in wireless broadband networks with channel adaptation", 2001 IEEE International Conference on Communications, Jun. 11, 2001, pp. 1401-1405, vol. 5, Helsinki, Finland.
Li, Guoqing, et al., "Dynamic Resource Allocation with Finite Buffer Constraint in Broadband OFDMA Networks", IEEE Wireless Communications and Networking, Mar. 2003, pp. 1037-1042, vol. 2.

\* cited by examiner

*Primary Examiner*—Wayne Cai
(74) *Attorney, Agent, or Firm*—Blakely, Sokoloff, Taylor & Zafman LLP

(57) ABSTRACT

A method of scheduling resources in an uplink of a wireless cellular communication system, comprising the steps of measuring, by each user equipment in a present cell, pilot strengths of adjacent cells to find base stations within adjacent cells on which the user equipment has the strongest inter-cell interferences and to calculate values of the inter-cell interferences in an uplink direction which is caused by the user equipment on said base stations within said adjacent cells; grouping all user equipments within the present cell based on the calculated values of the inter-cell interferences; grouping used sub-carriers based on the groups of the user equipments so that each group of user equipments corresponds to one group of sub-carriers; allocating each group of sub-carriers to the user equipments included in the group of user equipments selected corresponding to the group of sub-carriers; and based on the allocation of the group of the sub-carriers, calculating a modified signal noise interference power ratio of each user equipment on the corresponding group of sub-carriers, and performing a multi-user equipment resource scheduling algorithm.

11 Claims, 7 Drawing Sheets

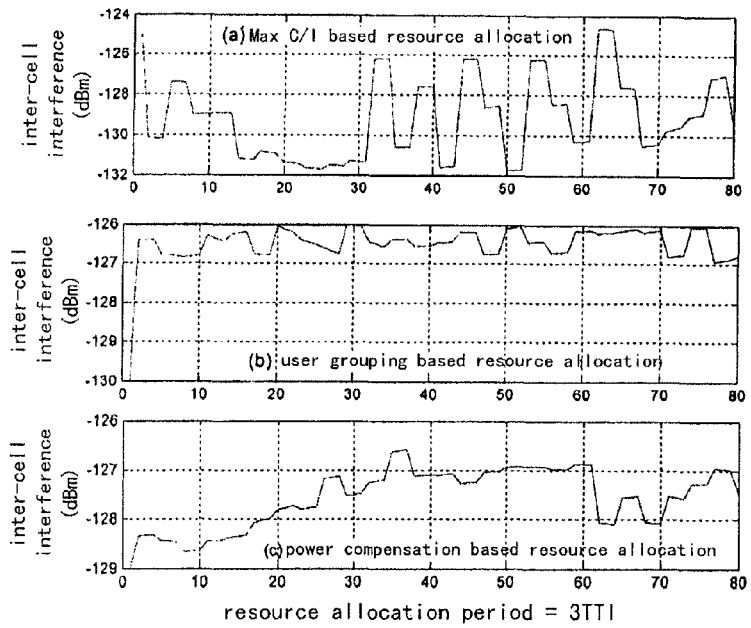
Fig. 8A
Fig. 8B
Fig. 8C
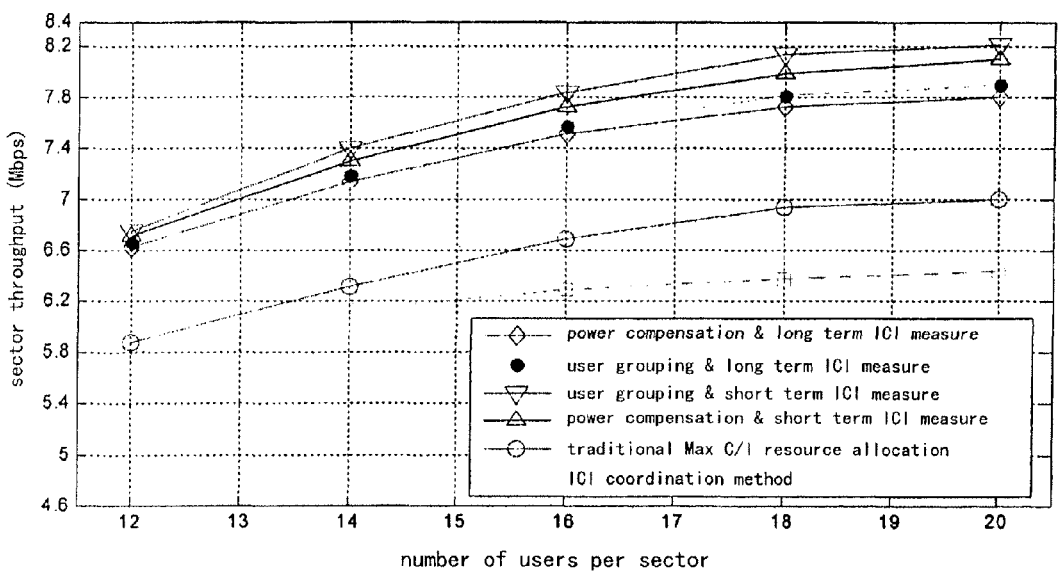
Fig. 9

METHOD OF SCHEDULING UPLINK RESOURCES IN CELLULAR COMMUNICATION SYSTEM

PRIORITY

The present application claims priority to and incorporates by reference the entire contents of Chinese priority document 200610143251.0, filed in China on Nov. 1, 2006.

BACKGROUND OF THE INVENTION

1. Field of Invention

The present invention relates to a method of scheduling uplink resources in a cellular communication system by using Orthogonal Frequency Division Multiple Access (OFDMA) and Single Carrier as the multiple access manner. More particularly, the present invention relates to a reliable adaptive resource scheduling method based on inter-cell interferences measurement for uplinks in a wireless cellular communication system so that the fluctuation of the inter-cell interferences caused by the resource scheduling may be reduced without dramatically increasing the algorithm complexity and obtain the great resource scheduling gain.

2. Description of Prior Art

As one of the key techniques in the future wireless mobile communication system, the Orthogonal Frequency Division Multiplexing (OFDM) is characterized in that the total frequency band of the system is divided into a great number of sub-carriers which are transmitted in parallel, have flat fadings, partially overlap with one another and are orthogonal with each other, whereby it efficiently protects the frequency from selective fadings, reduces the inter-symbol interferences caused by the multi-path, and increases the frequency spectrum utilization. Due to these technical advantages, the Orthogonal Frequency Division Multiplexing technique becomes one of the candidates to be used in the physical layer in the next generation wireless communication system researches such as IEEE 802 standard series and 3GPP long term evolution.

In addition to the above basic technical features, the application of the multiple access techniques based on the Orthogonal Frequency Division Multiplexing (for example, the Orthogonal Frequency Division Multiple Access (OFDMA) and DFT-S-OFDMA (a kind of single carrier which is characterized in both the low peak-average power ratio of the traditional signal carriers and the Orthogonal Frequency Division Multiplexing)) may further achieve multi-user diversity. Because different users may experience different fadings at the same time, a carrier having a severe fading for one user may make another user get a good channel quality. Thus, combining OFDMA or DFT-S-OFDMA with an efficient carrier resource scheduling method can dramatically increase the system throughput, and increase the frequency spectrum utilization.

However, in a wireless cellular communication system using OFDMA or a single carrier technique as the multiple access manner, the specific uplink inter-cell interferences will represent a characteristic of non-white noise in the frequency domain, and will fluctuate during the resource scheduling in the time domain. Such fluctuation will be troublesome for efficiently scheduling the resources. In the future wireless cellular communication system using OFDMA or DFT-S-OFDMA technique as the core technique, the interferences influencing the user equipments include inter-cell interferences and intra-cell interferences. The orthogonality among the sub-carriers or sub-channels ensures the orthogonality of the users within the same cell. Therefore, the inter-cell interferences become the main interferences on the user equipments. The inter-cell interferences represent a characteristic of non-white noise in the frequency domain. That is, the user may experience different interferences on different sub-carriers. Thus, during the resource scheduling, the frequency selectivity of the interferences on the user equipment has to be considered while considering the frequency dependent fadings on the user channel. Additionally, it is more important that the inter-cell interferences fluctuate during the resource scheduling, i.e., the resource scheduling will change the values of the inter-cell interferences, which is also a problem to be considered during the resource scheduling. Then, in the future wireless cellular communication system, the uplink resource scheduling and the inter-cell interferences will be a pair of inter-restricted factors.

In a CDMA system, all users within the same cell share the frequency resources. The interferences on user equipments and base stations within one cellular cell come from all users within other cells of the system. Generally, it is assumed that the inter-cell interferences in the CDMA system are Average White Gaussian Noise (AWGN). In a case where the frequency multiplexing factor is 1, signals sent by all the users in the adjacent cells will bring the inter-cell interferences. The overlapping of a great number of users' signals will average the difference between the interference signals of different users so that the actual inter-cell interference signals have a flat characteristic in the frequency spectrum similar to the AWGN.

Unlike the CDMA system, in an OFDM or single carrier based cellular system, within a same cellular cell, each sub-carrier or sub-channel is occupied by only one user. In this case, interferences from adjacent cells on a certain user equipment or base station only include those caused by the users using the same carrier or channel in other cells. That is, in the OFDM system, the interferences from the adjacent cells are much less. Such less interferences will result in dramatic changes in the inter-cell interferences during the resource adjustment of the corresponding cells. There is only one interfering user within one cell, and thus the inter-cell interferences may not have a behavior similar to the AWGN.

Firstly, the interference signals are subjected to the multi-path transmission and thus represent frequency dependent fadings. Secondly, the interference signals on different sub-carriers may also come from the different users within the adjacent cells. These users' signals may be subjected to different path losses, shadow fadings and channel fast fadings so that the strengths of the interference signals are not uniformly distributed in the frequency spectrum. Additionally, since there is no overlapping of multiple users' signals, the fluctuations in the strengths of the interference signals when the sub-carrier or sub-channel is reassigned can not be averaged. Therefore, the inter-cell interferences represent a non-white noise characteristic.

FIG. 1 shows the simulated condition of the inter-cell interferences in the OFDMA based wireless cellular communication system. When the number of the interference sources reduces to a certain degree, the interferences from the user equipments within the adjacent cells on the user equipment using the same carrier or channel with in the present cell dramatically fluctuate over time. The interference curve shown in FIG. 1 represents the non-white noise characteristic.

In addition to the characteristic of non-white noise in the frequency domain, the inter-cell interferences also change in the time domain along with the intra-cell resource scheduling. One resource allocation scheme determines one kind of non-white noise for the inter-cell interferences, and the scheduled another resource allocation scheme will determine another kind of non-white noise for the inter-cell interferences. This phenomenon is shown as that the inter-cell interferences fluctuate during the resource scheduling.

FIG. 2 shows the simulated result of the change in the inter-cell interferences on the single carrier on the user equipment during the intra-cell resource scheduling. The curve shown in FIG. 2 gives the characteristic of the fluctuation of the inter-cell interferences during the resource scheduling. The resource scheduling includes reallocation of the sub-carriers or channels, or power changes within the cell. The resource scheduling or reallocation within the adjacent cells of the communication system will result in the dramatic changes in the interferences signals in the interested cell (the present cell). That is, the interferences from the adjacent cells are different from those in-advance expected ones.

As described above, in the cells of the wireless cellular communication system using the OFDM, since the inter-cell interferences from the adjacent cells fluctuate dramatically, the algorithm in which the resource scheduling in the system is applied based on the measured Signal/Noise Ratio (SNR) is not applicable any more. On one hand, it is because the corresponding calculation can not be performed dependent upon the inaccurate Signal/Noise Ratio; and on the other hand, the adaptive encoding and modulation will be error since the adaptive encoding and modulation has a very restricted requirement to the stability of the Signal/Noise Ratio. If the estimation of the Signal/Noise Ratio has some deviations, the mechanism of the adaptive encoding and modulation will be greatly influenced, which will result in the errors in the allocated encoding rate and modulation order.

Due to the characteristic of non-white noise, the resource scheduling algorithm shall consider not only the fading conditions of respective sub-carriers or single carrier, but also the inter-cell interferences on the sub-carriers or single carrier. Unlike predicting the channel fadings by channel estimation, however, the characteristic of fluctuations during the resource scheduling makes the inter-cell interferences be burst and unpredictable during the resource scheduling. Therefore, if the inter-cell interferences are obtained dependent on the estimation before scheduling, as is done in traditional resource scheduling, the user equipments within the adjacent cells after the resource scheduling will experience quite different interferences and thus the system performance will be greatly reduced.

FIG. 3(*a*) shows the inter-cell interferences estimated by the user before the resource scheduling by stimulating the prior art, and FIG. 3(*b*) shows the actual experienced inter-cell interferences after the scheduling. From FIGS. 3(*a*) and 3(*b*), it can be seen that the main problems in such scheduling are as follows.

1. On a sub-channel whose interferences are estimated over-high, the resource can not be completely used;
2. On a sub-channel whose interferences are estimated over-low, the user equipment will experience worse channel quality;
3. The deviation of the interference estimation will result in the erroneous estimation of the signal interference noise ratio and further influence the exactness of the adaptive encoding and modulation.

Therefore, in the next generation wireless cellular system using the OFDMA or single carrier technique as the multiple access technique, the characteristics of non-white noise and fluctuation during the resource scheduling of the inter-cell interferences require that the resource scheduling algorithm used in such system shall consider the coordinate among the cells in order to efficiently reduce the negative influences caused by the inter-cell interferences.

A plurality of algorithms for reducing the inter-cell interferences, including interference elimination, interference randomization and interferences coordinate, are introduced in *Dynamic Resource Allocation With Buffer Constraints In Broadband OFDMA Networks*, Guoqing and Hui Liu, WCNC' 2003, March, 2003, New Orleans (Reference 1). However, these methods only address how to reduce the inter-cell interferences, but cannot efficiently solve the conflicting between the fluctuation of the inter-cell interferences and the resource scheduling. An integrated resource scheduling method is introduced in *Carrier Assignment Algorithms In Wireless Broadband Networks With Channel Adaptation*, Iordanis Koutsopoulos and Leandros Tassiulas, Proc of ICC. 2001, vol. 5, pp. 1401-1405 (Reference 2), which may mitigate the problems caused by the above algorithms only considering the reduction of the inter-cell interferences. However, the algorithm proposed in Reference 2 has a higher complexity since it requires to estimate the intra-cell and the inter-cell channels, and thus has a higher overhead, which limits its application in the actual system.

SUMMARY OF THE INVENTION

A method of scheduling uplink resources in cellular communication system is described. In one embodiment, A method of scheduling resources in an uplink of a wireless cellular communication system, comprises: measuring, by each user equipment in a present cell, pilot strengths of adjacent cells to find base stations within adjacent cells on which the user equipment has the strongest inter-cell interferences and to calculate values of the inter-cell interferences in an uplink direction which is caused by the user equipment on said base stations within said adjacent cells; grouping all user equipments within the present cell based on the calculated values of the inter-cell interferences; grouping used sub-carriers based on the groups of the user equipments so that each group of user equipments corresponds to one group of sub-carriers; allocating each group of sub-carriers to the user equipments included in the group of user equipments selected corresponding to the group of sub-carriers; and based on the allocation of the group of the sub-carriers, calculating a modified signal noise interference power ratio of each user equipment on the corresponding group of sub-carriers, and performing a multi-user equipment resource scheduling algorithm within each group of users on the corresponding group of sub-carriers

BRIEF DESCRIPTION OF THE DRAWINGS

The above and other embodiments, features and advantages of the present invention will be apparent by describing the preferred embodiments of the present invention in conjunction with the drawings in which:

FIG. 3(*b*) is a schematic diagram showing the inter-cell interferences experienced by the user terminal after the resource scheduling;

FIGS. 8(a) to 8(c) are schematic diagrams showing the reduction of the fluctuation of the inter-cell interferences obtained according to the methods of the present invention; and FIG. 9 is a schematic diagram showing the throughput gain of the wireless cellular communication system obtained according to the method of the present invention.

DETAILED DESCRIPTION OF PREFERRED EMBODIMENTS

Figure 1:
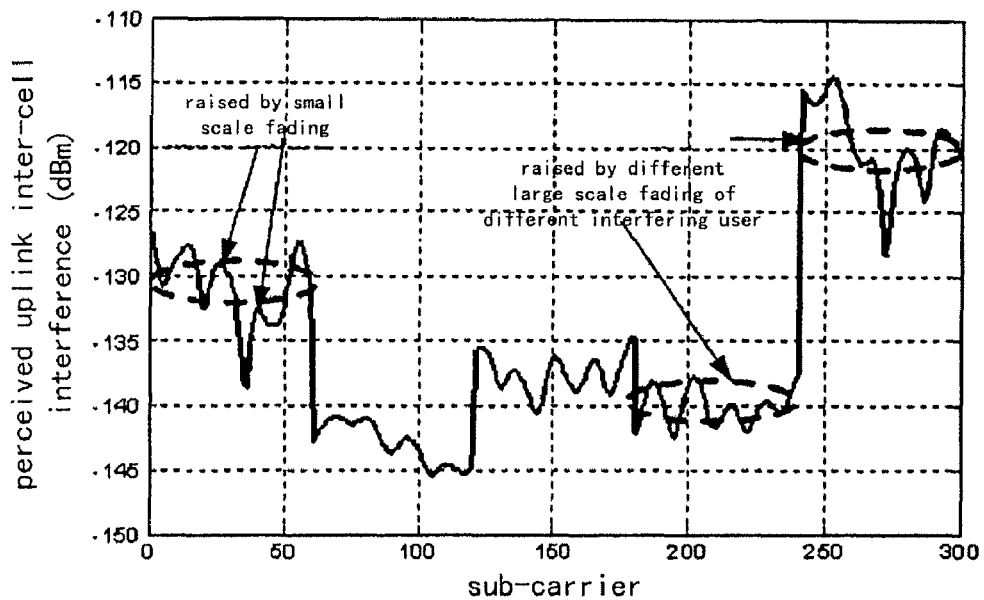
FIG. 1 is a schematic diagram showing the characteristic of non-white Gaussian noise of the uplink inter-cell interferences in the wireless cellular communication system.
Figure 2:
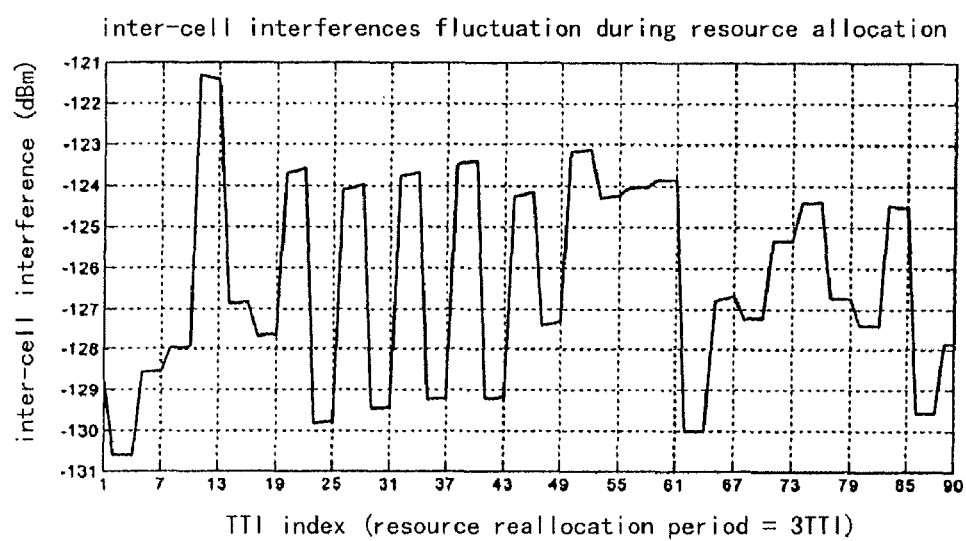
FIG. 2 is a schematic diagram showing the fluctuation of the uplink inter-cell interferences during the resource scheduling in the wireless cellular communication system.
Figures 3A, 3B:
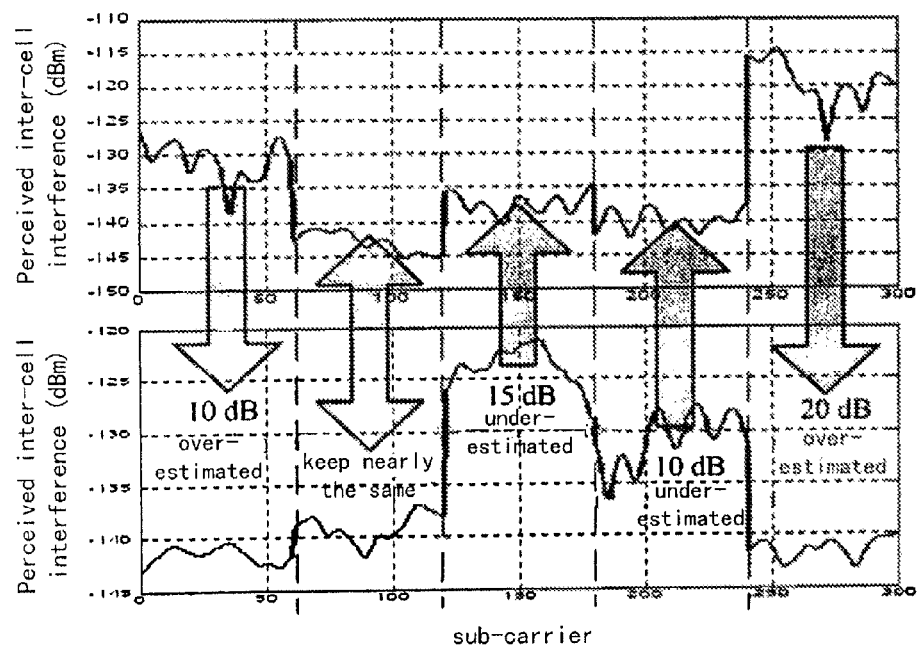
FIG. 3(*a*) is a schematic diagram showing the inter-cell interferences estimated by the user terminal before the resource scheduling by simulation according to the prior arts.

In view of the above problems, an embodiment of the present invention include a method of scheduling resources based on inter-cell interferences, which may reduce the fluctuation of the inter-cell interferences in order to make the wireless resource scheduling more accurate.

According to an embodiment of the present invention, there is provided a method of scheduling resources in an uplink of a wireless cellular communication system, comprising: measuring, by each user equipment in a present cell, pilot strengths of adjacent cells to find base stations on which the user equipment has the strongest inter-cell interferences and to calculate values of the inter-cell interferences in an uplink direction which is caused by the user equipment on said base stations; grouping all user equipments within the present cell based on the calculated values of the inter-cell interferences; grouping used sub-carriers based on the groups of the user equipments so that each group of user equipments corresponds to one group of sub-carriers; allocating each group of sub-carriers to the user equipments included in the group of user equipments selected corresponding to the group of sub-carriers; and based on the allocation of the group of the sub-carriers, calculating a modified signal noise interference power ratio of each user equipment on the corresponding group of sub-carriers, and performing a multi-user equipment resource scheduling algorithm.

According to another embodiment of the present invention, there is provided a method of scheduling resources in an uplink of a wireless cellular communication system, comprising the steps of: measuring, by a user equipment, pilot strengths of adjacent cells to find base stations on which the user equipment has the strongest inter-cell interferences; and notifying the measured powers to a base station of the present cell; calculating, by each user equipment, a transmitting power $P_t$ to be adjusted if a predetermined sub-carrier is used based on the measured pilot powers of the strongest adjacent base station and the transmitting power of the pre-served user equipment on the predetermined sub-carrier; using the calculated transmitting power $P_t$ to be adjusted and intra-cell channel fading and interference to estimate a signal noise interference ratio generated by the user equipment; and performing a multi-user equipment resource scheduling algorithm by using the signal noise interference power ratio of the user equipment on each sub-carrier.

According to still another embodiment of the present invention, there is provided a method of scheduling resources in an uplink of a wireless cellular communication system, comprising the steps of: measuring, by each user equipment in a present cell, pilot strengths of adjacent cells to find base stations on which the user equipment has the strongest inter-cell interferences and to calculate values of the inter-cell interferences in an uplink direction which is caused by the user equipment on said base stations; grouping all user equipments within the present cell based on the calculated values of the inter-cell interferences; grouping used sub-carriers based on the groups of the user equipments so that each group of user equipments corresponds to one group of sub-carriers; allocating each group of sub-carriers to the user equipments included in the group of user equipments selected corresponding to the group of sub-carriers; calculating a transmitting power $P_t$ to be adjusted if each user equipment in the specific group of user equipments uses the sub-carrier in the corresponding group of sub-carriers; and calculating a signal noise interference ratio of the user equipment on said group of sub-carriers based on the transmitting power $P_t$ to be adjusted, and performing a multi-user equipment resource scheduling algorithm based on the signal noise interference power ratio.

According to one embodiment of the present invention, when performing the resource scheduling, the sub-carrier is limited to be used by only one specific group of users, in which this group of users generates the inter-cell interferences on this sub-carrier same as or similar to those generated by a user who occupied this sub-carrier in a period before the resource scheduling. Alternatively, when a user is scheduled onto a new sub-carrier, the transmitting power will be adjusted so that the inter-cell interferences generated by the user are almost the same as those generated by a pervious user who occupied this sub-carrier.

Hereinafter, the preferred embodiments of the present invention will be detailed by referring to the drawings. The unnecessary details and functions are omitted in the description when it may confuse the understanding of the present invention.

Firstly, in the wireless resource scheduling algorithm, the signal interference noise power ratio on the sub-carrier is an important factor which can be expressed by Expression (1) as follows.

$$CIR_i^j = \frac{H_i^j}{\sum_{n=1}^{N} I_{intra}^n + \sum_{m=1}^{M} I_{inter}^m + N_j} \quad (1)$$

where $CIR_i^j$ represents a carrier interference ratio of the $i^{th}$ user on the $j^{th}$ sub-carrier; $H_i^j$ represents a channel gain of the $i^{th}$ user on the $j^{th}$ sub-carrier; $I_{intra}^n$ represents an intra-cell interference from the $n^{th}$ user; $I_{inter}^m$ represents an inter-cell interference from the $m^{th}$ user; and $N_j$ represents a thermal noise on the $j^{th}$ sub-carrier.

Since the orthogonality of the sub-carriers in the OFDM system ensures the orthogonality of the users within a cell, the intra-cell interferences may be omitted as compared with the inter-cell interferences. Therefore, the carrier interference ratio on the sub-carrier expressed by Expression (1) can be approximately given by Expression (2) as follows.

$$CIR_i^j \approx \frac{H_i^j}{\sum_{m=1}^{M} I_{inter}^m + N_j} \quad (2)$$

The wireless resources such as sub-carriers, powers and bits can be allocated to multiple users with a Maximum Carrier to Interference (hereinafter referred to as Max C/I) algorithm or a Proportional Fair (hereinafter referred to as PF) algorithm and the like based on the carrier interference ratio of each user equipment on each sub-carrier. The Max C/I algorithm and the PF algorithm are prior art.

The Max C/I scheduling algorithm is a typical scheduling algorithm to achieve a maximum system capacity by using "multi-user diversity". The basic principle thereof is to order all user equipments to be served according to C/I predicted values of their received signals, and then perform the transmission in a descending order. In this manner, a user equipment closer to the base station will always receive the service due to its good channel condition, whereas the user located at the edge of the cell will have an influenced service quality due to its lower C/I. The PF algorithm allocates a corresponding priority to each user within the cell, and the user having the highest priority will be served.

An embodiment of the present invention comprises a reliable adaptive resource scheduling method for an uplink of a future wireless cellular communication system in a condition where the carrier interference ratio fluctuates due to the fluctuation of the inter-cell interferences, which may mitigate the influence of the inter-cell interference fluctuation and achieve a prominent resource scheduling gain in a premise not greatly increasing the complexity of the algorithm.

For determining which user equipments within one cell or served by the base station within the cell may use the corresponding sub-carriers without causing the fluctuation of the inter-cell interferences on the adjacent cells, a parameter record table reflecting the communication conditions within the cell can be established in the base station of the cell. The parameter record table may record the number of the sub-carriers under the corresponding base station, the usage conditions of respective sub-carriers used by the user equipments, and the communication conditions of the cells (for example, two cells adjacent to the present cell) most strongly influenced by the respective sub-carriers. These parameters include the conditions of the interferences on the adjacent cells before the scheduling, for example, within one period before the scheduling. The parameters recorded in the parameter record table can be updated in real time in order to calculate which user equipments within the cell may use the corresponding sub-carrier. Table 1 shows a parameter record table according to one embodiment of the present invention.

TABLE 1

| User Index | Average ICI to B1 | Average ICI to B2 |
|---|---|---|
| i | ICI (i, B1) | ICI (i, B2) |
| ... | ... | ... |
| j | ICI (j, B1) | ICI (j, B2) |
| ... | ... | ... |

In the above Table 1, ICI (j, B1) (inter-cell interferences) represents the interference value of the $j^{th}$ user equipment to the base station B1 within the cell 1; ICI (j, B2) represents the interference value of the $j^{th}$ user equipment to the base station B2 within the cell 2. Thereby, the inter-cell interferences caused by each user equipment using the corresponding sub-carrier can be calculated by using Expression (1) or (2) shown above, and then it can determine which users may use the corresponding sub-carrier without causing interference fluctuation on the user equipments within the adjacent cells.

It shall be noted that in the present embodiment, two adjacent cells to which the present cell has the strongest inter-cell interferences are described only as an example. However, the present invention is not intended to be limited thereto, and may use the inter-cell interferences on more than two adjacent cells or just one adjacent cell.

As for the measurement of the interferences to the adjacent cells, it can be classified into a Frequency Division Duplex (FDD) mode and a Time Division Duplex (TDD) mode according to the usage conditions. In the FDD mode, the base station within the cell measures the inter-cell interferences in the uplink of the user equipment, and then notifies the base stations within the present invention in a manner of wired or wireless Fixed bandWidth Access (FWA) or the like. In the TDD mode, the user equipment measures the inter-cell interferences. When the user equipment obtains the downlink interferences from the adjacent cells from the pilot signal measurements, it feedbacks the measured inter-cell interferences to the base station of the present cell. In the TDD mode, the complementary between the uplink and the downlink is utilized, i.e., given that the large scale fading of downlink and uplink directions are nearly the same.

According to the method of the present invention, the measurement of the inter-cell interferences is an important part and is also a key factor to determine the algorithm complexity. As is known, the inter-cell interferences will experience path losses, shade fadings and rapid fadings. Actually, as shown in FIG. 1, the major factor resulting in the fluctuation of the interference signals is the different path losses and shade fadings between different users. Considering the complexity and overhead of the algorithm, the short-term inter-cell interference measurement can be replaced with the long-term inter-cell interference measurement. In this case, for the purpose of handover, the downlink pilot signals of adjacent cells are always being measured. Therefore, the inter-cell interferences can be calculated by using Expression (3) as follows.

$$I_{inter}(k,B) = P_d(k) \times I_{inter}(B,k)/P_c(B) \quad (3)$$

where $P_d(k)$ represents a transmitting power of the user k; $I_{inter}(B,k)$ represents the downlink inter-cell interference value of the base station B received by the user k on the pilot channel; and $P_c(B)$ represents the downlink transmitting power of the base station B on the pilot channel.

According to the technical solution of the present invention, the above embodiments can be achieved by three different adaptive resource scheduling algorithms as follows.

1. An adaptive resource scheduling algorithm based on inter-cell interference measurement and user grouping;
2. An adaptive resource scheduling algorithm based on inter-cell interference measurement and user power adjustment; and
3. An adaptive resource scheduling algorithm incorporating inter-cell interference measurement, user grouping and user power adjustment.

EXAMPLE 1

Figure 5:
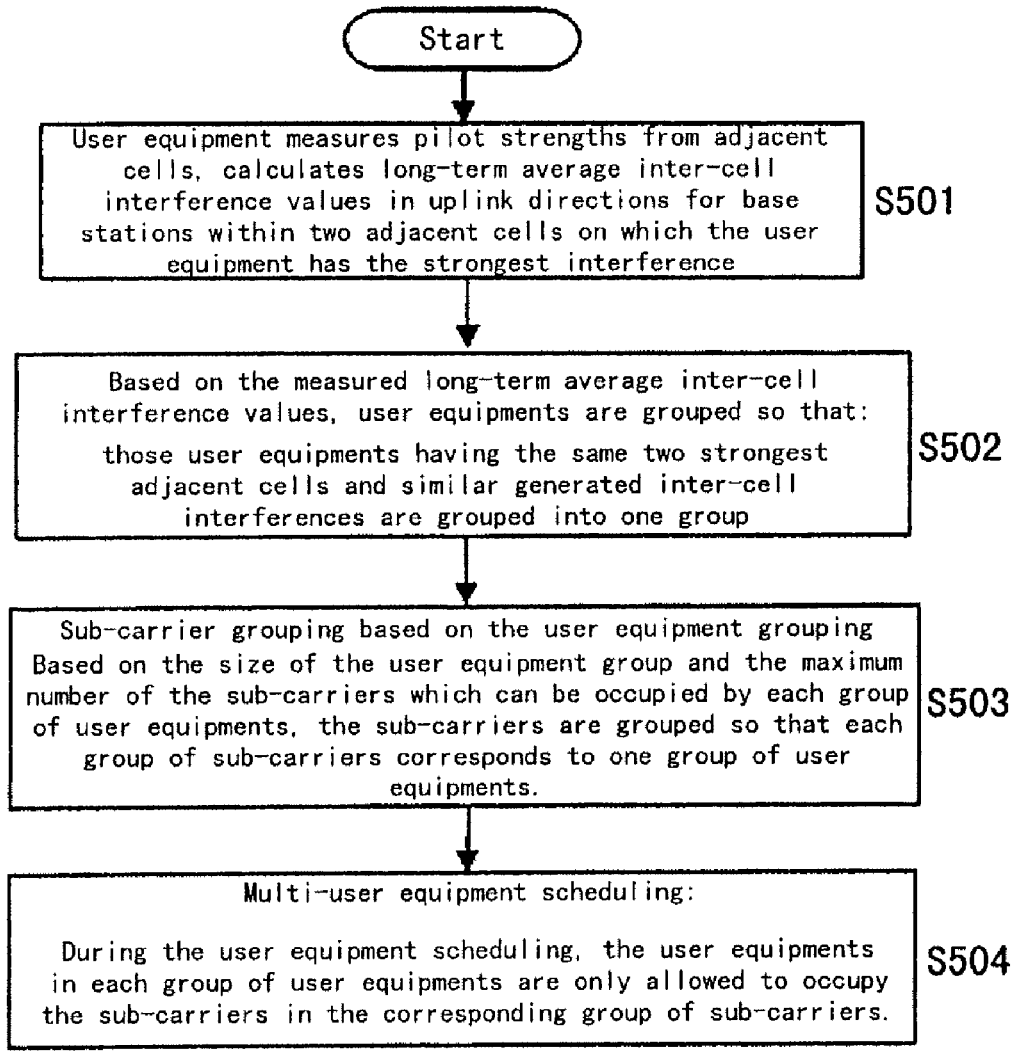
FIG. 5 is a flowchart illustrating a method of adaptively scheduling resources based on user grouping according to an embodiment of the present invention.

Next, the adaptive resource scheduling algorithm based on inter-cell interference measurement and user grouping will be described. As shown in FIG. 5, firstly, at step S501, each user equipment in a present cell measures pilot strengths of adjacent cells to find base stations within two adjacent cells on which the user equipment has the strongest inter-cell interferences and to calculate values of the inter-cell interferences in an uplink direction which is caused by the user equipment on said base stations within said two adjacent cells. Thereafter, at step S502, all user equipments within the present cell are grouped into several groups based on the calculated values of the inter-cell interferences on the adjacent cells. Next, at step S503, sub-carriers are grouped based on the groups of the user equipments so that each group of user equipments corresponds to one group of sub-carriers. At step S504, each group of sub-carriers is only allocated to the user equipments included in the group of user equipments selected corresponding to the group of sub-carriers. For other users not grouped into the specific user groups of the corresponding sub-carriers, the signal noise interference ratios of these users on the corresponding sub-carriers are set into zero. According to the restriction of the sub-carrier allocation, a modified signal noise interference power ratio of each user equipment on each sub-carrier is calculated, and then a multi-user equipment resource scheduling algorithm such as Max C/I or PF is performed.

Figure 4:
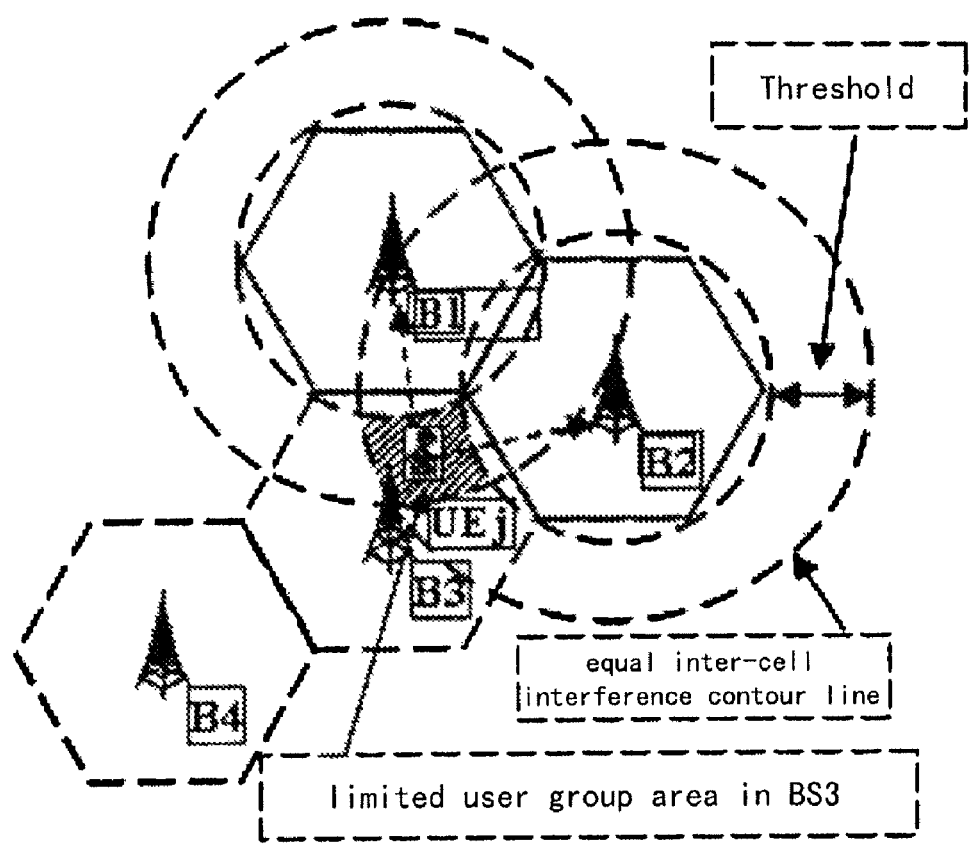
FIG. 4 is a schematic diagram showing the adaptive resource scheduling based on user grouping in the wireless cellular communication system.

FIG. 4 shows an actual model of the wireless cellular communication system. Next, the process of adaptively scheduling the resources based on the user grouping in the wireless cellular communication system will be described by referring to FIG. 4. As shown in FIG. 4, it is assumed that the cell in which the base station B3 is located is the interested cell (also referred to as "the present cell"). The cells adjacent to the base station B3, i.e., the cells in which the base stations B1, B2 and B4 are respectively located, are the cells generating the interferences as the interference sources. It shall be noted that for simplicity, FIG. 4 shows only three cells as the adjacent cells, but in the actual wireless cellular communication system, the cell 3 in which the base station B3 is located may include other adjacent cells (not shown) which are also the interference sources of the cell 3.

Before the resource scheduling, for each sub-carrier under the base station B3, the user equipments using the corresponding sub-carriers before the scheduling are firstly determined. As shown in FIG. 4, before the resource scheduling, it is assumed that the user equipment UEj uses the sub-carrier S. Thereafter, for the user equipment UEj, two adjacent cells on which the user equipment UEj has the strongest interferences are found. For example, it is assumed that the user equipment UEj has the strongest interferences on the cells 1 and 2 in which the base stations B1 and B2 are respectively located as shown in FIG. 4. Next, the interference values of the user equipment UEj on the cells 1 and 2 are calculated. To determine whether other user equipments may use the sub-carrier S or not during the process of the resource scheduling or the sub-carrier reallocation, a group of user equipments needs to be found in the cell 3. The condition of selecting the group of user equipments is that the interferences on the adjacent cells 1 and 2 or base stations B1 and B2 generated by the group of user equipments when using the sub-carrier S are approximate the same as those on the cells 1 and 2 generated by the user equipment UEj in the previous period in order to perform the grouping schedule of the selected specific groups of user equipments.

The break lines around the cells 1 and 2 are similar to iso-gain contour lines which are the lines on which the inter-cell interferences are equal to each other. That is, the user equipments around the break lines will generate the same or similar interferences to the base station B1 or the base station B2. As shown in FIG. 4, the shading part in the cell 3 represents that the user equipments within the area of the cell 3 generate the same interferences on both the adjacent cells 1 and 2. After such user group areas are found, the sub-carrier S can be allocated only to the user equipments within the user group during the carrier (resource) scheduling process. That is, the user equipments within the user group have access to select the sub-carrier S to be allocated so that the sub-carrier or resource may generate the same or similar inter-cell references on the adjacent cells before and after the allocation. Similarly, the adjacent cells will perform the above operation so that the inter-cell interferences of the adjacent cells on the present cell are substantially the same irrespective of the resource allocations. Thus, the fluctuations of the inter-cell interferences caused during the resource scheduling in the wireless cellular communication system can be suppressed.

In the multi-cell model as shown in FIG. 4, it is assumed to calculate the user group for the sub-carrier s. Then, the user j occupying this sub-carrier in one period before the resource scheduling is firstly found, and thereafter, two adjacent base stations $B_1$ and $B_2$ on which the user j has the strongest interferences are found. Then, the user group $\phi_s$ for the sub-carrier s is calculated by using the equal inter-cell interference contour lines as shown in FIG. 4. The user group $\phi_s$ can be calculated according to Expression (4) as follows.

$$\phi_s = \{k\} \qquad (4)$$
$$k = \arg\left(\begin{cases} |I_{inter}(k, B_2) - I_{inter}(j, B_2)| \leq Th_1 \\ |I_{inter}(k, B_1) - I_{inter}(j, B_1)| \leq Th_2 \end{cases}\right)$$

where $I_{int\ er}(k,B)$ represents the inter-cell interferences in the uplink direction from the user k to the base station B; and $Th_1$ and $Th_2$ are two thresholds which determine the maximum difference among the users within the user group.

Other sub-carrier grouping methods corresponding to the user equipment grouping include a method of determining the size of the sub-carrier group according to the number of the user equipments in the user equipment group and the maximum number of the sub-carriers available to each user equipment. Expression (5) shows the number of the carriers in the sub-carrier group corresponding to the user equipment group.

$$N(\phi(k)) = \frac{N_{\phi(k)}}{\sum_k N_{\phi(k)}} * N_{TOTAL} \qquad (5)$$

where N(φ(k)) represents the number of the carriers in the sub-carrier group corresponding to the user equipment group, $$N_{\varphi(k)} = \sum_{i \, \bar{l} \, \varphi(k)} C_i,$$

$C_i$ represents the maximum number of the sub-carriers available to the user equipment i, and $N_{TOTAL}$ represents the total number of the sub-carriers.

EXAMPLE 2

Next, the adaptive resource scheduling algorithm based on inter-cell interference measurement and user power adjustment will be described.

Figure 6:
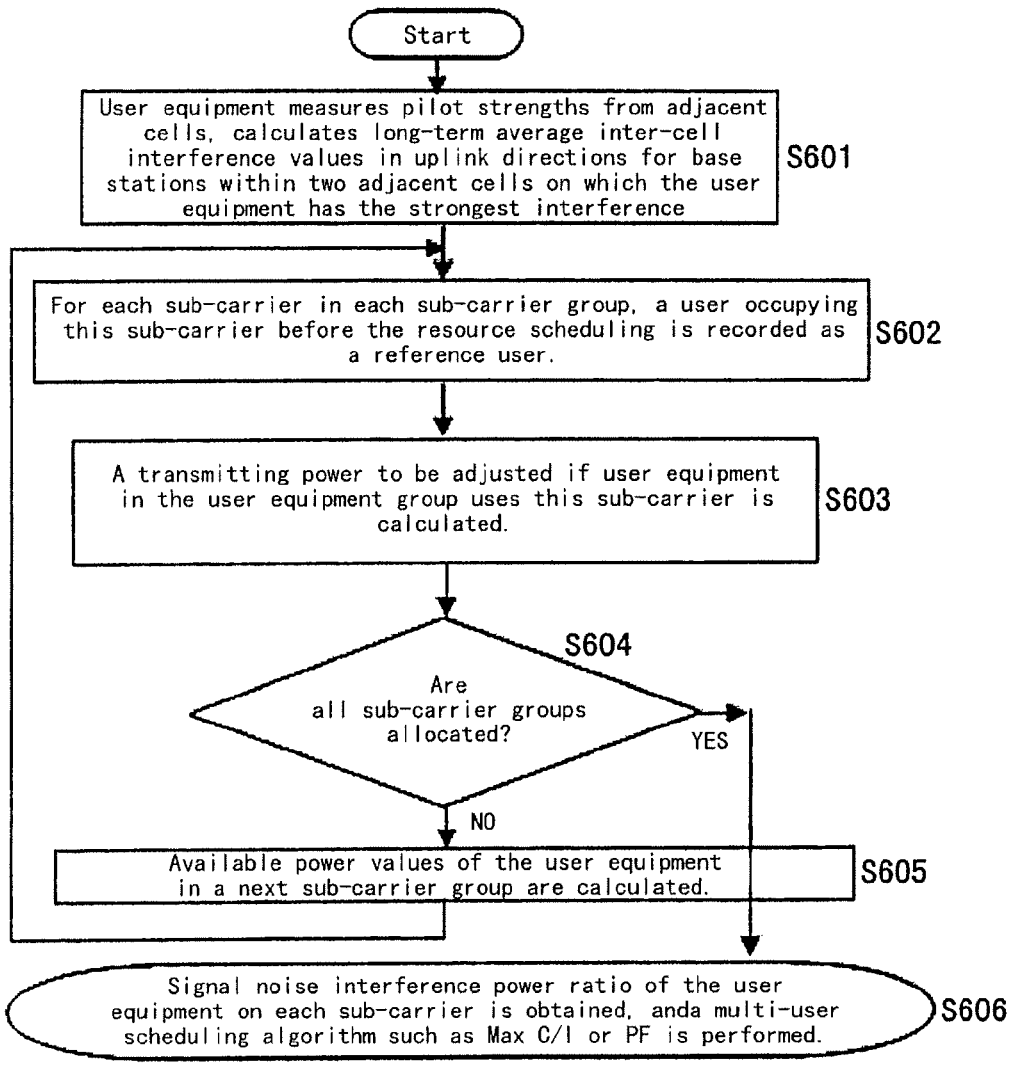
FIG. 6 is a flowchart illustrating a method of adaptively scheduling resources based on inter-cell interference measurement and user power adjustment according to an embodiment of the present invention.

As shown in FIG. 6, firstly, at step S601, a base station in a present cell measures a signal noise interference power ratio of each user on each sub-carrier. The user equipment measures pilot strengths of adjacent cells to find two adjacent base stations on which each user equipment has the strongest inter-cell interferences. The user equipment measures powers of downlink pilots of said two adjacent base station, and notifies the measured powers to the base station of the present cell. Thereafter, at step S602, for a sub-carrier s in the cell, the user j occupying the sub-carrier in the previous period before the scheduling is recorded as a reference user j. Next, at step S603, the corresponding user equipment calculates a transmitting power $P_t$ to be adjusted if the sub-carrier is used according to Expression (6) as follows.

$$\begin{cases} P_t \leq P_c \times \dfrac{I_p(j, B1)}{I_p(k, B1)} \\ P_t \leq P_c \times \dfrac{I_p(j, B2)}{I_p(k, B2)} \end{cases} \quad (6)$$

where $P_c$ represents the transmitting power of the user k on the pilot channel.

Thereafter, based on the transmitting power $P_t$ to be adjusted (calculated from Expression (6)) and the intra-cell channel fadings and interferences, the signal noise interference power ratio possibly generated by the user is calculated according to Expression (7).

$$SINR(k) = P_t \times H_{int\_ra}(k,B)/I(B) \quad (7)$$

where $H_{int\_ra}(k,B,s)$ represents the channel gain of the user k on the sub-carrier s, and $I(B,s)$ represents the interference signal on the sub-carrier s.

Then, at step S604, it is determined whether the above steps S602 and S603 have been performed for all the sub-carriers or not, and thus the signal noise interference power ratios of all the users on the respective sub-carriers are obtained and recorded into a parameter table indicating the communication status. If the determination of step S604 gives a positive result, then the procedure goes to step S606 in which a multi-user scheduling algorithm, such as Max C/I or PF, is performed based on the signal noise interference power ratio values of the user equipments on the respective sub-carriers obtained at step S604. If the determination of step S604 gives a negative result, then the procedure goes to step S605 in which the specific user group of the next sub-carrier is selected and the above steps S602 to S604 are performed for the selected user group, until the scheduling is correspondingly performed for all the sub-carriers to be scheduled.

Actually, Expression (8) can be obtained if the user's transmitting power satisfying Expression (6) is used to calculate the inter-cell interferences.

$$\begin{aligned} I_{inter}(k, B1) &= P_t \times H_{inter}(k, B1) \leq P_c \times \frac{I_{inter}(j, B1)}{I_p(k, B1)} \times H_{inter}(k, B1) \quad (8) \\ &= I_{inter}(j, B1) \times \frac{P_c \times H_{inter}(k, B1)}{I_p(k, B1)} \\ &= I_{inter}(j, B1) \times 1 = I_{inter}(j, B1) \end{aligned}$$

That is, the resource scheduling procedure after the power adjustment ensures that the inter-cell interferences generated by the new users on each sub-carrier are not higher than the inter-cell interferences estimated in the previous scheduling period. Therefore, the influence of the inter-cell interference fluctuation on the wireless resource scheduling algorithm is eliminated.

EXAMPLE 3

Next, the adaptive resource scheduling method incorporating inter-cell interference measurement, user grouping and user power adjustment will be described. This adaptive resource scheduling method incorporates the features of the Examples 1 and 2, and further improves the performance for the resource scheduling of the wireless cellular communication system.

Figure 7:
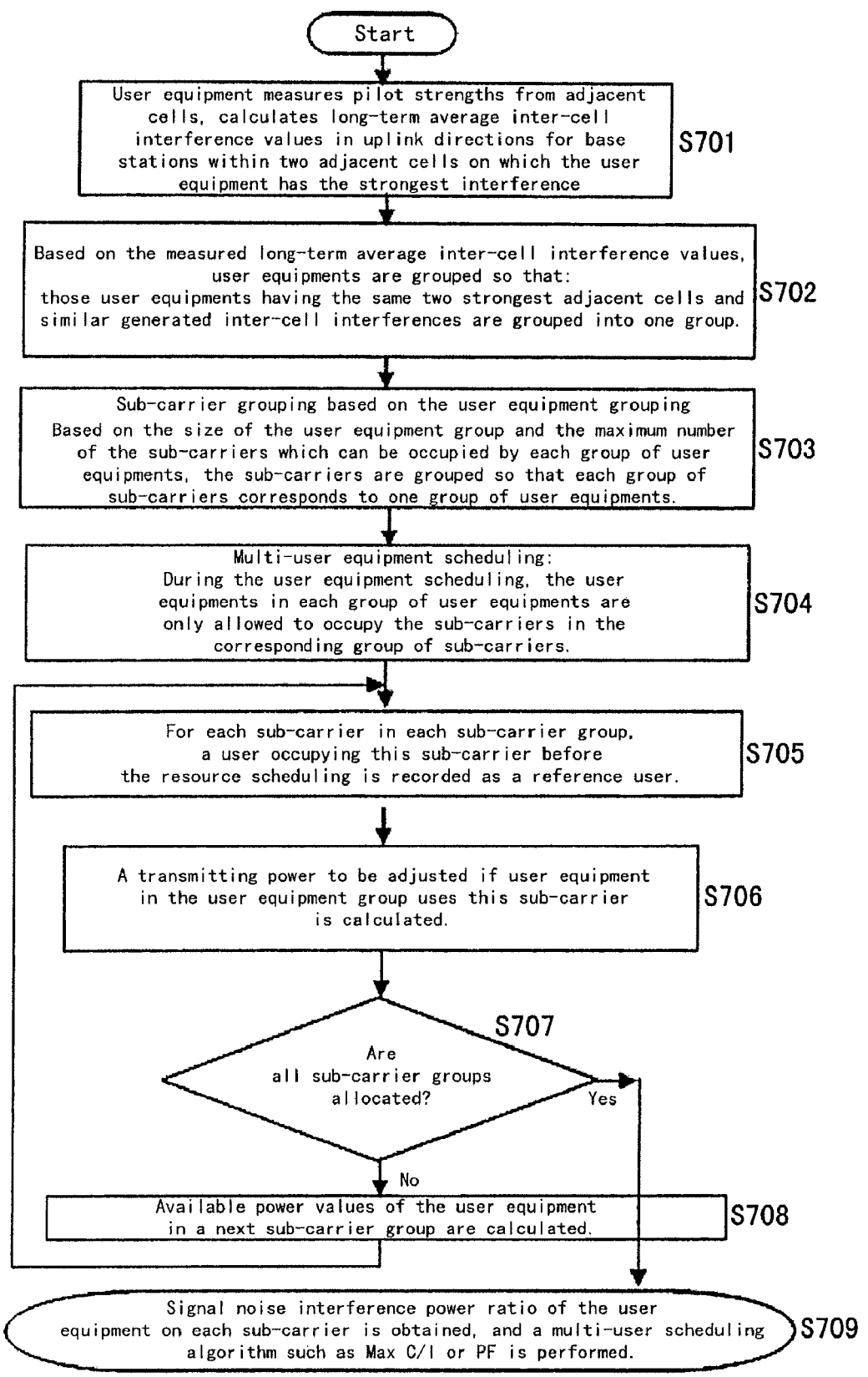
FIG. 7 is a flowchart illustrating a method of adaptively scheduling resources incorporating inter-cell interference measurement, user grouping and user power adjustment according to an embodiment of the present invention.

As shown in FIG. 7, firstly, at step S701, each user equipment in a present cell measures pilot strengths of adjacent cells to find base stations within two adjacent cells on which the user equipment has the strongest inter-cell interferences and to calculate values of the inter-cell interferences in an uplink direction which is caused by the user equipment on said base stations within said two adjacent cells. Thereafter, at step S702, all user equipments within the present cell are grouped into several groups based on the calculated values of the inter-cell interferences on the adjacent cells. Next, at step S703, sub-carriers are grouped based on the groups of the user equipments so that each group of user equipments corresponds to one group of sub-carriers. At step S704, each group of sub-carriers is only allocated to the user equipments included in the group of user equipments selected corresponding to the group of sub-carriers. For other users which are not grouped into the specific user groups of the corresponding sub-carriers, the signal noise interference ratios of these users on the corresponding sub-carriers are set into zero. Thereafter, at step S705, for each sub-carrier in each sub-carrier group, the user j occupying the sub-carrier before the scheduling (for example, in the previous period) is recorded as a reference user j. Next, at step S706, the corresponding user equipment calculates a transmitting power $P_t$ to be adjusted if the sub-carrier is used according to the above Expression (6). Thereafter, based on the transmitting power $P_t$ to be adjusted (calculated from Equation (6)) and the intra-cell channel fadings and interferences, the signal noise interference power ratio possibly generated by the user is calculated according to Expression (7), and is recorded into the parameter record table indicating the communication status.

Then, at step S707, it is determined whether the above steps S705 and S706 have been performed for all the sub-carrier groups or not, and thus the transmitting power to be adjusted of all the users on the corresponding sub-carriers are obtained. If the determination of step S707 gives a negative result, then the procedure goes to step S708 in which the next sub-carrier group is selected an the signal noise interference power ratios of the corresponding user equipment group on the sub-carrier group are calculated. Thereafter, the procedure returns to step S705, and the steps S705 to S708 are repeatedly performed, until the signal noise interference power ratios of the corresponding user equipment groups on these sub-carrier groups are calculated for all the sub-carriers to be scheduled.

Otherwise, if the determination of step S707 gives a positive result, then the procedure goes to step S709 in which a multi-user scheduling algorithm such as Max C/I or PF is performed based on the signal noise interference power ratio values of the user equipments on the respective sub-carriers obtained at step S706.

FIGS. 8(a) to 8(c) show the reduction of the fluctuation of the inter-cell interferences obtained according to the methods of the present invention. FIG. 8(a) is a fluctuation curve of the inter-cell interference obtained by the Max C/I based resource allocating method. FIG. 8(b) is a fluctuation curve of the inter-cell interference obtained by the resource allocating method based on the user grouping according to one embodiment of the present invention. FIG. 8(c) is a fluctuation curve of the inter-cell interference obtained by the resource allocating method based on the power compensation according to one embodiment of the present invention. Comparing the curves as shown in FIGS. 8(a) to 8(c), it can be seen that the adaptive resource scheduling methods according to one embodiment of the present invention greatly reduce the fluctuation of the inter-cell interferences during the resource scheduling.

FIG. 9 is a schematic diagram showing the throughput gain of the wireless cellular communication system obtained according to the method of the present invention. Comparing the adaptive resource scheduling methods of the present invention with the conventional resource allocating methods such as Max C/I, the throughput of the wireless cellular communication system is obviously improved.

Those described above are only better specific embodiments of the present invention, and the scope of the present invention is not limited thereto. Within the technical scope disclosed by the present invention, changes or replacements obvious for those skilled in the art are intended to fall into the scope of the present invention. Therefore, the scope of the present invention is defined in the claims.

What is claimed is:

1. A method of scheduling resources in an uplink of a wireless cellular communication system, comprising the steps of:
    measuring, by each user equipment in a present cell, pilot strengths of adjacent cells to find base stations within adjacent cells on which the user equipment has the strongest inter-cell interferences and to calculate values of the inter-cell interferences in an uplink direction which is caused by the user equipment on said base stations within said adjacent cells;
    grouping user equipments within the present cell based on the calculated values of the inter-cell interferences;
    grouping used sub-carriers based on the groups of the user equipments so that each group of user equipments corresponds to one group of sub-carriers;
    allocating each group of sub-carriers to the user equipments included in the group of user equipments selected corresponding to the group of sub-carriers; and
    based on the allocation of the group of the sub-carriers, calculating a modified signal noise interference power ratio of each user equipment on the corresponding group of sub-carriers, and performing a multi-user equipment resource scheduling algorithm within each group of users on the corresponding group of sub-carriers.

2. The method according to claim 1, wherein grouping user equipments comprises selecting those user equipments having substantially same uplink inter-cell interferences on said base stations within said adjacent cells as one group of user equipments.

3. The method according to claim 1, wherein grouping sub-carriers comprises determining the size of the sub-carrier group according to the number of the user equipments in the user equipment group and the maximum number of the sub-carriers available to each user equipment according to the following calculation formula:

$$N(\phi(k)) = \frac{N_{\phi(k)}}{\sum_k N_{\phi(k)}} * N_{TOTAL}$$

where $N(\phi(k))$ represents the number of the carriers in the sub-carrier group corresponding to the user equipment group, $$N_{\varphi(k)} = \sum_{i \bar{I} \varphi(k)} C_i,$$

$C_i$ represents the maximum number of the sub-carriers available to the user equipment i, and $N_{TOTAL}$ represents the total number of the sub-carriers.

4. The method according to claim 1, further comprising setting the signal noise interference ratios of said other user equipments on the sub-carriers in the corresponding groups of the sub-carriers into zero with respect to other user equipments in the groups of the user equipments that are not selected as the specific user equipments of the corresponding groups of the sub-carriers.

5. The method according to claim 1, further comprising recording the modified signal noise interference ratios of the user equipment on the corresponding sub-carriers into a parameter record table.

6. A method of scheduling resources in an uplink of a wireless cellular communication system, comprising the steps of:
    measuring, by each user equipment in a present cell, pilot strengths of adjacent cells to find base stations within adjacent cells on which the user equipment has the strongest inter-cell interferences and to calculate values of the inter-cell interferences in an uplink direction which is caused by the user equipment on said base stations within said adjacent cells;
    grouping all user equipments within the present cell based on the calculated values of the inter-cell interferences;
    grouping used sub-carriers based on the groups of the user equipments so that each group of user equipments corresponds to one group of sub-carriers;
    allocating each group of sub-carriers to the user equipments included in the group of user equipments selected corresponding to the group of sub-carriers;
    calculating a transmitting power $P_t$ which is needed to be adjusted when each user equipment in the specific group of user equipments uses the sub-carrier in the corresponding group of sub-carriers;
    calculating a signal noise interference ratio of the user equipment on said group of sub-carriers based on the transmitting power $P_t$ to be adjusted, and performing a multi-user equipment resource scheduling algorithm based on the signal noise interference power ratio.

7. The method according to claim 6, wherein grouping user equipments comprises selecting those user equipments having substantially same uplink inter-cell interferences to said base stations as one group of user equipments.

8. The method according to claim 6, wherein grouping sub-carriers comprises determining the size of the sub-carrier group according to the number of the user equipments in the user equipment group and the maximum number of the sub-carriers available to each user equipment according to the following calculation formula:

$$N(\phi(k)) = \frac{N_{\phi(k)}}{\sum_k N_{\phi(k)}} * N_{TOTAL}$$

where $N(\phi(k))$ represents the number of the carriers in the sub-carrier group corresponding to the user equipment group, $$N_{\varphi(k)} = \sum_{i \in \varphi(k)} C_i, C_i$$

represents the maximum number of the sub-carriers available to the user equipment i, and $N_{TOTAL}$ represents the total number of the sub-carriers.

9. The method according to claim 6, further comprising setting the signal noise interference ratios of said other user equipments on the sub-carriers in the corresponding groups of the sub-carriers into zero with respect to other user equipments in the groups of the user equipments which are not selected as the specific user equipments of the corresponding groups of the sub-carriers.

10. The method according to claim 6, further comprising recording the modified signal noise interference ratios of the user equipment on the corresponding sub-carriers into a parameter record table.

11. The method according to claim 6, wherein the transmitting power $P_t$ that is needed to be adjusted when the pre-determined sub-carrier is used is calculated according to the following formula:

$$\begin{cases} P_t \leq P_c(k) \times \frac{I_p(j, B1)}{I_p(k, B1)} \\ P_t \leq P_c(k) \times \frac{I_p(j, B2)}{I_p(k, B2)} \end{cases}$$

where $P_c(k)$ represents the transmitting power of the user equipment k on the pilot channel; $I_p(j,B1)$ and $I_p(j,B2)$ are the downlink pilot power values of said two adjacent base stations measured by the user equipment j, $I_p(k,B1)$ and $I_p(k,B2)$ represent the downlink pilot power values of said two base stations measured by the user equipment k.

* * * * *